US010378325B2

United States Patent
Panga et al.

(10) Patent No.: US 10,378,325 B2
(45) Date of Patent: Aug. 13, 2019

(54) AQUEOUS RETARDED ACID SOLUTION AND METHODS FOR USE THEREOF

(71) Applicant: Schlumberger Technology Corporation, Sugar Land, TX (US)

(72) Inventors: Mohan Kanaka Raju Panga, Sugar Land, TX (US); Christopher Daeffler, Houston, TX (US); Olga Vladimirovna Nevvonen, Houston, TX (US)

(73) Assignee: SCHLUMBERGER TECHNOLOGY CORPORATION, Sugarland, TX (US)

( * ) Notice: Subject to any disclaimer, the term of this patent is extended or adjusted under 35 U.S.C. 154(b) by 0 days.

(21) Appl. No.: 15/090,747

(22) Filed: Apr. 5, 2016

(65) Prior Publication Data

US 2016/0298024 A1 Oct. 13, 2016

Related U.S. Application Data

(60) Provisional application No. 62/145,945, filed on Apr. 10, 2015.

(51) Int. Cl.
*E21B 43/26* (2006.01)
*C09K 8/74* (2006.01)
*C09K 8/84* (2006.01)

(52) U.S. Cl.
CPC .............. *E21B 43/26* (2013.01); *C09K 8/74* (2013.01); *C09K 8/845* (2013.01)

(58) Field of Classification Search
None
See application file for complete search history.

(56) References Cited

U.S. PATENT DOCUMENTS

| | | | | |
|---|---|---|---|---|
| 2,485,529 A | * | 10/1949 | Cardwell | C23G 1/04 510/263 |
| 4,420,414 A | * | 12/1983 | Valone | C10M 133/04 106/14.15 |
| 5,120,471 A | * | 6/1992 | Jasinski | C09K 8/54 252/389.54 |
| 5,220,960 A | | 6/1993 | Totten et al. | |

(Continued)

OTHER PUBLICATIONS

Xu et al., "On the Origin of Proton Mobility Suppression in Aqueous Solutions in Amphiphiles", J. Phys. Chem. B. 2013, 117, 15426-15435.

(Continued)

*Primary Examiner* — Anuradha Ahuja
(74) *Attorney, Agent, or Firm* — Andrea E. Tran

(57) ABSTRACT

Methods include combining an amount of water and an acid retarding agent (RA), where the amount of water is present in an amount up to about 5 times the mass of the RA, inclusive, and wherein the RA includes at least one salt compound. An amount of acid is dissolved in the combined amount of water and RA to form a composition, where the amount of acid is a molar ratio of acid:RA of between 4.0 and 0.2, inclusive, and wherein the amount of acid is up to about 36% by weight of total weight of the composition. The composition is injected into a wellbore penetrating a subterranean formation at a pressure, which may be less than the fracture initiation pressure of the subterranean formation in some cases, while in other cases equal to or greater than the fracture initiation pressure.

20 Claims, 4 Drawing Sheets

(56) References Cited

U.S. PATENT DOCUMENTS

| | | | | |
|---|---|---|---|---|
| 5,990,051 A | * | 11/1999 | Ischy | E21B 43/261 166/294 |
| 6,117,364 A | * | 9/2000 | Vorderbruggen | C09K 8/54 252/395 |
| 6,436,880 B1 | * | 8/2002 | Frenier | C09K 8/52 507/131 |
| 7,915,205 B2 | * | 3/2011 | Smith | C09K 8/74 166/307 |
| 8,163,102 B1 | * | 4/2012 | MacDonald | C11D 1/72 134/22.1 |
| 8,940,106 B1 | * | 1/2015 | MacDonald | C11D 1/62 134/36 |
| 2006/0180308 A1 | | 8/2006 | Welton et al. | |
| 2007/0235189 A1 | * | 10/2007 | Milne | C09K 8/74 166/280.1 |
| 2009/0247431 A1 | * | 10/2009 | Gupta | C09K 8/74 507/237 |
| 2012/0238479 A1 | * | 9/2012 | Choudhary | C09K 8/54 507/204 |
| 2013/0261032 A1 | * | 10/2013 | Ladva | C09K 8/00 507/131 |
| 2014/0116708 A1 | * | 5/2014 | Wadekar | C09K 8/74 166/307 |
| 2014/0171345 A1 | | 6/2014 | Steiner | |
| 2014/0329725 A1 | | 11/2014 | Karale | |
| 2015/0080271 A1 | | 3/2015 | De Wolf et al. | |
| 2015/0260021 A1 | * | 9/2015 | Reyes | C09K 8/528 166/300 |
| 2015/0322762 A1 | * | 11/2015 | Varadaraj | C09K 8/90 166/265 |
| 2015/0344771 A1 | | 12/2015 | Jiang et al. | |

OTHER PUBLICATIONS

Callahan et al., "Solvation of Magnesium Dication: Molecular Dynamics Simulation and Vibrational Spectroscopic Study of Magnesium Chloride in Aqueous Solution", J. Phys. Chem. A. 2010, 114, 5141-5148.

Wyman, "Dielectric Constants: Ethanol-Diethyl Ether and Urea-Water Solutions between 0 and 50°"", J. Am. Chem. Soc. 1933, 55, 4116-4121.

Edward et al., "The Dielectric Increments of Amino Acids", J. Am. Chem. Soc. 1974, 96, 902-906.

Panga et al., "Two-Scale Continuum Model for Simulation of Wormholes in Carbonate Acidization", AIChE J. 2005, 51, 3231-3248.

International Search Report issued in related PCT application PCT/US2016/025967 dated Jul. 14, 2016, 3 pages.

Written Opinion issued in related PCT application PCT/US2016/025967 dated Jul. 14, 2016, 6 pages.

Examination Report issued in GCC Patent Appl. No. GC 2016-31138 dated Jul. 17, 2018; 4 pages.

* cited by examiner

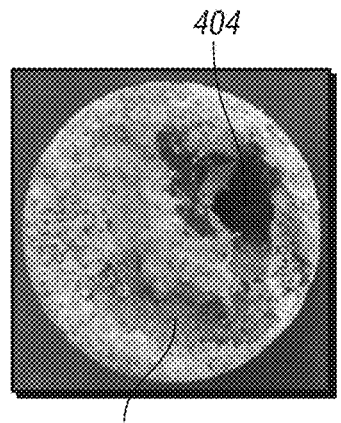
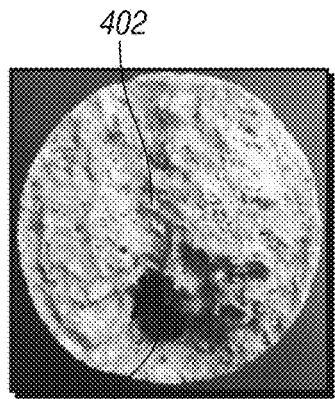
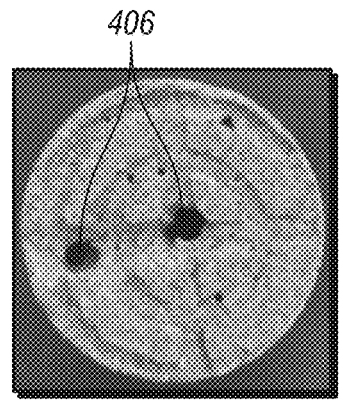
*FIG. 4A*  *FIG. 4B*  *FIG. 4C*
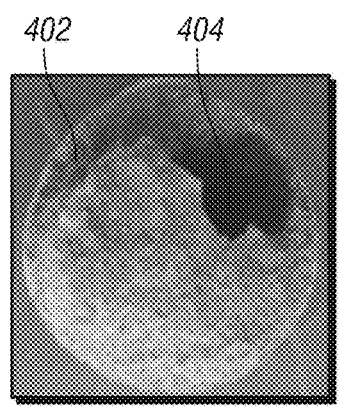
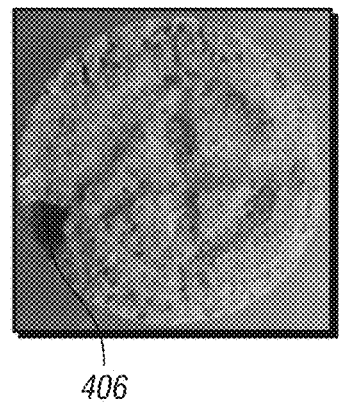
*FIG. 4D*  *FIG. 4E*

AQUEOUS RETARDED ACID SOLUTION AND METHODS FOR USE THEREOF

RELATED APPLICATION INFORMATION

This application claims the benefit of U.S. Provisional Application Ser. No. 62/145,945 filed Apr. 10, 2015, which is incorporated herein in its entirety.

BACKGROUND

This section provides background information to facilitate a better understanding of the various aspects of the disclosure. It should be understood that the statements in this section of this document are to be read in this light, and not as admissions of prior art.

Hydrocarbon fluids such as oil and natural gas are obtained from a subterranean geologic formation, commonly referred to as a reservoir, by drilling a well that penetrates the hydrocarbon-bearing formation. Once a wellbore is drilled, various forms of well completion components may be installed in order to control and enhance the efficiency of producing the various fluids from the reservoir. Well treatment methods often are used to increase hydrocarbon production by using a chemical composition, such as a treatment fluid.

Stimulation operations may be performed to facilitate production of fluids from subsurface formations by increasing the net permeability of a reservoir. There are two main stimulation techniques: matrix stimulation and fracturing. Matrix stimulation is accomplished, typically in sandstone rich formations, by injecting a fluid (e.g., acid or solvent) to dissolve and/or disperse materials that impair well production. Specifically, matrix stimulation may be performed (1) by injecting chemicals into the wellbore to react with and dissolve the damage and (2) by injecting chemicals through the wellbore and into the formation to react with and dissolve small portions of the formation to create alternative flowpaths for the hydrocarbon (e.g., instead of removing the damage, redirecting the migrating oil around the damage). Fracturing involves injecting chemicals through the wellbore and into the formation at pressures sufficient to actually fracture the formation, thereby creating a large flow channel through which hydrocarbon can more readily move from the formation and into the wellbore.

In carbonate formations, the goal of matrix stimulation is to create new, unimpaired flow channels from the formation to the wellbore. Matrix stimulation, typically called matrix acidizing when the stimulation fluid is an acid, generally is used to treat the near-wellbore region. In a matrix acidizing treatment, the acid used (for example hydrochloric acid for carbonates) is injected at a pressure low enough to prevent formation fracturing. When injected at low rates into carbonate formations, the acid can form conductive wormholes that extend radially from the wellbore. Acids can also be injected into subterranean formation at rates high enough to cause fracturing. In this case, the acid unevenly dissolves the walls of the fracture, so that when the injection is stopped and the fracture closes, conductive channels to the well remain.

One of the problems often encountered in the application of acids, especially inorganic acids, at elevated carbonate reservoir temperatures, is their excessive reaction rate toward carbonate originating from a lack of restriction to the mobility of the protons. For example, HCl is very reactive, and at higher temperatures (such as 200° F. and higher) and/or low injection rates, favors facial dissolution over wormholing. For this reason, less reactive acid formulations have been pursued. One approach is to use organic acids such as formic and acetic acid. Organic acids have higher $pK_a$'s than HCl, but will not completely spend in the reservoir. A second approach is to suspend the acid as a water-in-oil emulsion, which restricts aqueous acid contact with the reservoir and thus slows the reaction rate.

Numerous approaches have been applied toward retarding the acid reactivity, mainly via physical means. For example, it is common in oilfield operations to encapsulate inorganic acid into shells of polymer gel, linear or crosslinked, or light oils in the presence of surfactant and/or chelating agent. Each of these options offers a certain level of performance, but at the same time brings several undesirable side effects.

At present, acid treatments are plagued by two primary limitations namely, limited radial penetration and severe corrosion to pumping and wellbore tubing. Both effects are associated with the higher-than-desired reaction rate (or spending rate) of inorganic acids, such as HCl, toward carbonate surface, in particular at higher temperatures. Limitations on radial penetration are caused by the fact that as soon as the acid, in particular inorganic acids, such as by nonlimiting example, HCl, is introduced into the formation or wellbore, it reacts instantaneously with the formation matrix and/or the wellbore scaling. In practice, the dissolution is so rapid that the injected acid is spent by the time it reaches no more than a few inches beyond the wellbore, incapable of generating much desired fracture length far from the wellbore. Organic acids (e.g., formic acid, acetic acid and/or lactic acid and its polymeric version) are sometimes used to address limitations on radial penetration since organic acids react more slowly than inorganic acids. Increasingly, retarded acid systems, which use techniques such as gelling the acid, oil-wetting the formation, or emulsifying the acid with oil, are used. Each of such alternatives, however, has associated drawbacks and is an imperfect solution to limited radial penetration.

Other limitations related to the use of acids are: 1) very high miscibility of acids with water when the potential for undesirable migration of the acid-bearing fluid into a water-saturated zone is a concern; and 2) iron precipitation, especially in sour wells, where the iron sulfide scale formed in boreholes, tubulars, and/or formations is dissolved by the acid with the formation of hydrogen sulfide ($H_2S$) and undesirable iron precipitates such as ferric hydroxide or ferrous sulfide that affect the permeability of the formation. Therefore, acid treatment fluids often contain additives to minimize iron precipitation and $H_2S$ evolution, for example by sequestering the iron ions in solution, or by reducing ferric ions to the more soluble ferrous form of iron.

The performance of a fracture acidizing treatment job may be measured by the length of the fracture that is effectively acidized. The distance a reactive acid travels along the fracture (e.g., acid penetration depth), is governed by the acid flow (injection) rate and the acid reaction (spending) rate at the rock surface. In most of the circumstances encountered in acid treatment, the reaction rate between acid and rock is very fast, and the rate determining step is acid mass transfer from bulk to rock surface.

In fracture acidizing, the treatment fluid used is injected at a pressure high enough to cause formation fracturing, designed to open sustained flowpath network that connects limestone and/or dolomite reservoirs to the wellbore. In order to achieve deeper penetration in fracture acidizing, it is often desirable to retard the acid in such treatments as well. Common approaches to acid retardation for fracture acidizing include gelling, emulsifying and to a minor extent chemical intervention. Each of these methodologies brings certain advantages that are invariably accompanied by a set of disadvantages. For example, gelled acids provide moderate retardation in the temperature range of 80 to 200° F. As gels exhibit high viscosity and low friction loss, they function primarily as diverting agents, contributing to fluid loss reduction. In addition, the use of an emulsified acid that is applied to the fracture acidizing treatment of limestone and dolomite up to 300° F. Emulsified acid has the disadvantage of longer spending times and subsequent problems of cleaning due to the presence of residual oil. It is also common practice to retard acid using surfactants, although limited acid retardation is obtained. However, the deployment of surfactant also carries a few unwanted effects. For example, it could strip any existing coating on carbonate surfaces and as such act as an accelerator. Therefore, retardation schemes relying on surfactant films are often unreliable and ineffective. Furthermore, the attempt to use biodegradable, solid acid precursors such as polylactic acid in acidizing treatments has been plagued by the intrinsic disadvantage of very small acid capacity, leading to prohibitive costs and cumbersome dependency on formation temperature range which governs the rate of degradation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In a first aspect of the disclosure, methods are provided which include combining an amount of water and an acid retarding agent (RA), where the amount of water is present in an amount up to about 5 times the mass of the RA, inclusive, and the RA includes at least one salt compound. An amount of acid is dissolved in the combined amount of water and RA to form a composition, where the amount of acid is in an acid:RA molar ratio of between 4.0 and 0.2, inclusive, and wherein the amount of acid is up to about 36% by weight of total weight of the composition. The composition is injected into a wellbore penetrating a subterranean formation at a pressure, which may be less than the fracture initiation pressure of the subterranean formation in some cases, while in other cases equal to or greater than the fracture initiation pressure. In some aspects, wormholes are formed in the subterranean formation. The methods may further include dissolving at least a portion of the RA in the amount of water during the dissolving the amount of acid into the combined amount of water and RA. The RA may have an estimated retardation factor of equal to or great than about 3 at a temperature of 200° F. in some embodiments, and/or an estimated retardation factor of at least about 11 at a temperature of 70° F.

Any suitable acid, or mixture of acids, may be used, such as one or more of hydrogen chloride, hydrogen bromide, hydrogen iodide, hydrogen fluoride, sulfuric acid, nitric acid, phosphoric acid alkanesulfonic acids, arylsulfonic acids, acetic acid, formic acid, alkyl carboxylic acids, acrylic acid, lactic acid, glycolic acid, malonic acid, fumaric acid, citric acid and tartaric acid. In some aspects, the acid is present in an amount of from about 7.5 to about 36 wt % based on the total weight of the composition, from about 7.5 to about 28 wt % based on the total weight of the composition, or even from about 7.5 to about 20 wt % based on the total weight of the composition.

The salt compound used in the RA may be select from compounds having one or more cations selected from lithium, sodium, potassium, rubidium, cesium, beryllium, magnesium, calcium, strontium, barium, scandium, yttrium, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, boron, aluminum, gallium, indium, thallium, tin, ammonium, alkylammonium, dialkylammonium, trialkylammonium and tetraalkylammonium, and one or more anions selected from fluoride, chloride, bromide, iodide, sulfate, bisulfate, sulfite, bisulfite nitrate, alkanesulfonates, arylsulfonates, acetate and formate. In some aspects, the RA is present up to about 40 wt % based on the total weight of the composition, from about 10 to about 36 wt % based on the total weight of the composition, or even from about 10 to about 30 wt % based on the total weight of the composition.

In another aspect of the disclosure, methods include combining an amount of water and an acid retarding agent (RA), where the RA includes at least one salt compound, dissolving an amount of acid in the combined amount of water and RA to form a composition, where the amount of acid is from about 36% by weight of total weight of the composition, and injecting the composition into a wellbore penetrating a subterranean formation with a high pressure pump. The RA has an estimated retardation factor of at least about 5 at a temperature of 70° F. In some aspects, the composition is injected into the wellbore at a pressure less than the fracture initiation pressure of the subterranean formation, while in some other aspects, the composition is injected into the wellbore at a pressure equal to or greater than the fracture initiation pressure of the subterranean formation.

In yet another aspect of the disclosure, an amount of water is combined with an acid retarding agent (RA), where the RA includes at least one salt compound and urea, and an amount of acid is dissolved in the combined amount of water and RA to form a composition. The amount of acid is at least about 37% by weight of total weight of the composition. The composition is injected into a wellbore penetrating a subterranean formation.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIGS. 4A-4E depict face dissolution of core samples evaluated in accordance with the disclosure; and, FIG. 5 shows calcium generation concentration versus time curves for some aqueous acid solutions evaluated, according to the disclosure.

DETAILED DESCRIPTION

Figure 1:
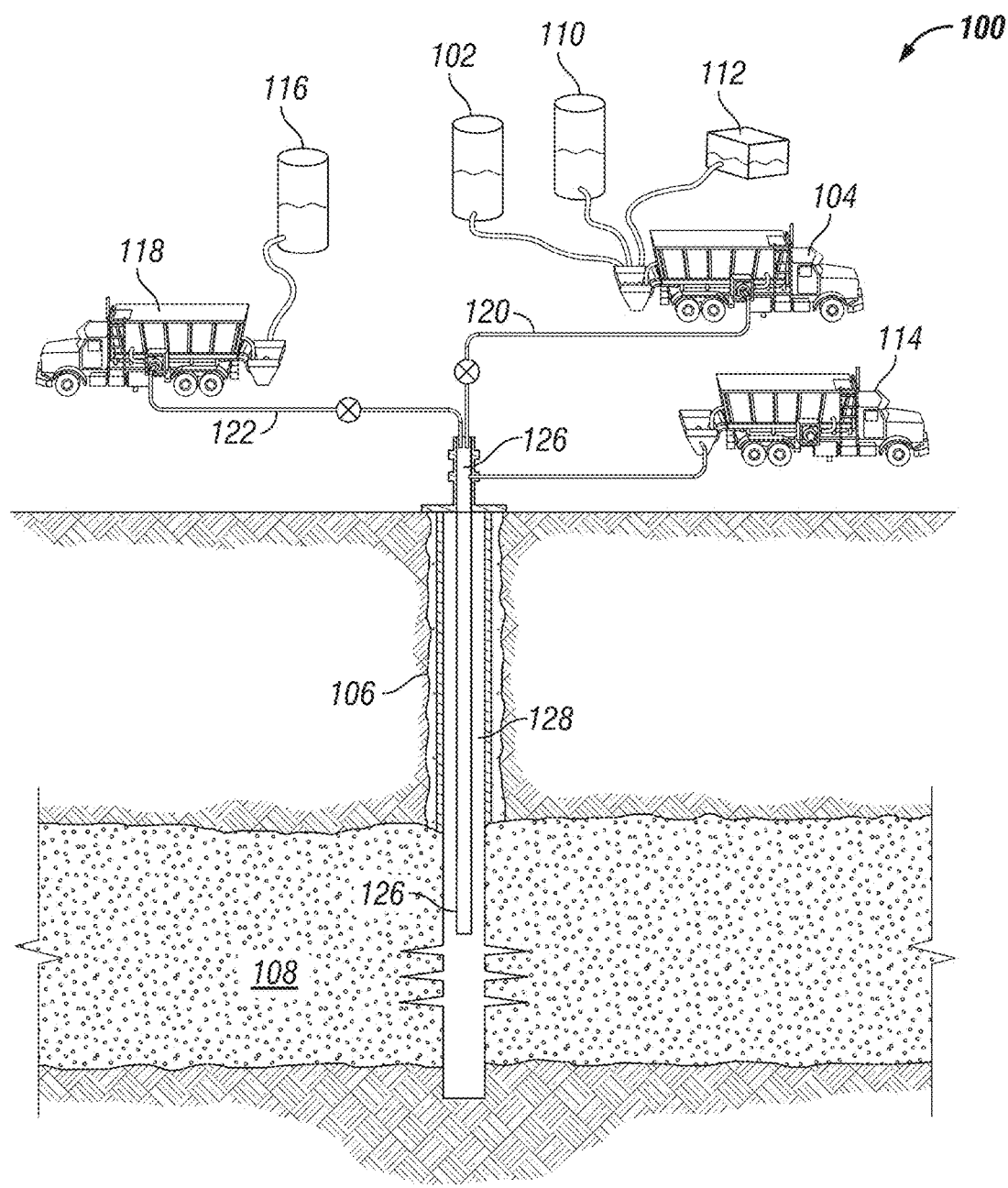
FIG. 1 depicts an example of equipment used to treat a wellbore and/or a formation fluidly coupled to the wellbore according to some embodiments of the disclosure.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount range listed or described as being useful, suitable, or the like, is intended that any and every concentration or amount within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The terms "formation" or "subterranean formation" as utilized herein should be understood broadly, and are used interchangeably. A formation includes any underground fluidly porous formation, and can include without limitation any oil, gas, condensate, mixed hydrocarbons, paraffin, kerogen, water, and/or $CO_2$ accepting or providing formations. A formation can be fluidly coupled to a wellbore, which may be an injector well, a producer well, and/or a fluid storage well. The wellbore may penetrate the formation vertically, horizontally, in a deviated orientation, or combinations of these. The formation may include any geology, including at least a sandstone, limestone, dolomite, shale, tar sand, and/or unconsolidated formation. The wellbore may be an individual wellbore and/or a part of a set of wellbores directionally deviated from a number of close proximity surface wellbores (e.g. off a pad or rig) or single initiating wellbore that divides into multiple wellbores below the surface.

The term "oilfield treatment fluid" as utilized herein should be understood broadly. In certain embodiments, an oilfield treatment fluid includes any fluid having utility in an oilfield type application, including a gas, oil, geothermal, or injector well. In certain embodiments, an oilfield treatment fluid includes any fluid having utility in any formation or wellbore described herein. In certain embodiments, an oilfield treatment fluid includes a matrix acidizing fluid, a wellbore cleanup fluid, a pickling fluid, a near wellbore damage cleanup fluid, a surfactant treatment fluid, an unviscosified fracture fluid (e.g. slick water fracture fluid), and/or any other fluid consistent with the fluids otherwise described herein. An oilfield treatment fluid may include any type of additive known in the art, which are not listed herein for purposes of clarity of the present description, but which may include at least friction reducers, inhibitors, surfactants and/or wetting agents, fluid diverting agents, particulates, acid retarders (except where otherwise provided herein), organic acids, chelating agents, energizing agents (e.g. $CO_2$ or $N_2$), gas generating agents, solvents, emulsifying agents, flowback control agents, resins, breakers, and/or non-polysaccharide based viscosifying agents.

The term "high pressure pump" as utilized herein should be understood broadly. In certain embodiments, a high pressure pump includes a positive displacement pump that provides an oilfield relevant pumping rate—for example at least 0.5 barrels per minute (bpm), although the specific example is not limiting. A high pressure pump includes a pump capable of pumping fluids at an oilfield relevant pressure, including at least 500 psi, at least 1,000 psi, at least 2,000 psi, at least 5,000 psi, at least 10,000 psi, up to 15,000 psi, and/or at even greater pressures. Pumps suitable for oilfield cementing, matrix acidizing, and/or hydraulic fracturing treatments are available as high pressure pumps, although other pumps may be utilized.

The term "treatment concentration" as utilized herein should be understood broadly. A treatment concentration in the context of an HCl concentration is a final concentration of the fluid before the fluid is positioned in the wellbore and/or the formation for the treatment, and can be any concentration necessary to provide sufficient acidic function. The treatment concentration may be the mix concentration available from the HCl containing fluid at the wellsite or other location where the fluid is provided from. The treatment concentration may be modified by dilution before the treating and/or during the treating. Additionally, the treatment concentration may be modified by the provision of additives to the fluid. In certain embodiments, a treatment concentration is determined upstream of additives delivery (e.g. at a blender, hopper, or mixing tub) and the concentration change from the addition of the additives is ignored. In certain embodiments, the treatment concentration is a liquid phase or acid phase concentration of a portion of the final fluid—for example when the fluid is an energized or emulsified fluid.

Aqueous compositions described below and useful in accordance with the disclosure exhibit a retarded acid reactivity that facilitates greater depth of fracture and/or matrix acidizing. The aqueous compositions useful according to the disclosure incorporate an acid. Nonlimiting examples of some suitable acid include hydrochloric acid (HCl), nitric acid, phosphoric acid, sulfuric acid, hydrofluoric acid, hydrobromic acid, perchloric acid, hydrogen iodide, alkanesulfonic acids, arylsulfonic acids, acetic acid, formic acid, alkyl carboxylic acids, acrylic acid, lactic acid, glycolic acid, malonic acid, fumaric acid, citric acid, tartaric acid, or their derivatives, and mixtures thereof. Generally, an acid is transported to a wellsite. According to some embodiments, the acid is present in the aqueous compositions in an amount up to about 36 wt %, or from about 7.5 to about 36 wt %, or from about 7.5 to about 28 wt %, or from about 7.5 to about 20 wt %, based on the total weight of the composition. In some other embodiments, acid is present in the aqueous compositions in an amount of at least about 37 wt %, In some embodiments, an acid that has shown particular utility in the aqueous composition according to the disclosure is hydrochloric acid. In some other embodiments, the aqueous composition may include an amount of hydrofluoric acid (HF). HF exhibits distinct reactions from HCl, and is useful in certain applications to enhance the activity of the resulting aqueous solution. For example, HF is utilized in the cleanup of sandstone formations where HCl alone is not effective for removing certain types of formation damage. It is believed that the present aqueous solution will have effects with HF similarly to the observed effects with HCl. Accordingly, solutions can be formulated with a total acid amount that is much higher than presently attainable formulations. In yet another embodiment, the HF is present in the aqueous composition in an amount of at least 0.25% by weight. The HF may be present in addition to the amount of HCl, and/or as a substitution for an amount of the HCl.

Another component of the aqueous compositions useful according to this disclosure are retarding agents (RA), which have utility in retarding the rate at which the acid solution reacts with carbonate-mineral, or other surfaces inside the formation. Thus, a retarding agent may slow the reactivity of the acid towards the carbonate-mineral surfaces, without compromising its acid capacity. Such retardation is useful in the context of stimulating or improving production from subterranean formations that contain hydrocarbons, steam, geothermal brines and other valuable materials as known in the art. Slowing the rate of reaction may allow deeper penetration of the acid into the subterranean formations than regular acid, thereby increasing the formation permeability and productivity. Retarding agents, as used herein, includes any material that reduces acid activity through a mechanism other than mere dilution. Non-limiting examples of such retarding agents include salt compounds having a cation selected from one or more of lithium, sodium, potassium, rubidium, cesium, beryllium, magnesium, calcium, strontium, barium, scandium, yttrium, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, boron, aluminum, gallium, indium, thallium, tin, ammonium, alkylammonium, dialkylammonium, trialkylammonium and tetraalkylammonium, and an anion selected from one or more of fluoride, chloride, bromide, iodide, sulfate, bisulfate, sulfite, bisulfite nitrate, alkanesulfonates, arylsulfonates, acetate and formate. According to the present embodiments, the retarding agent is added to the aqueous composition in an amount up to its solubility limit in the aqueous composition. According to some embodiments, the retarding agent is present in the aqueous compositions in an amount of up to about 40 wt %, from about 5 to about 40 wt %, from about 10 to about 36 wt %, or from about 10 to about 30 wt %, based on the total weight of the composition.

In some embodiments, the aqueous composition may include HCl as the acid in a weight fraction exceeding 37%. The retarding agent present in some aqueous compositions useful in accordance with the disclosure allows the HCl fraction to exceed the 37% normally understood to be the limit of HCl solubility at atmospheric pressure. Such retarding agents include at least one salt compound and urea, or urea derivative. Above 37%, normally, the evolution of HCl gas from the solution prevents the HCl fraction from getting any higher. In one or more embodiments, the HCl weight fraction of the aqueous solution may be as high as 45.7 wt %.

Methods, whereby HCl reactivity is attenuated by certain retarding agent compounds, modify the physical and structural properties of water, such as that disclosed in United States Patent Application Publication No. US 2015/0344771 A1, and related continuity patents and applications, the disclosures of which are included herein in their entirety by reference. Without being bound by any particular theory, inventors envisage mechanisms that inhibit acid activity. The first involves the disruption of the hydrogen-bonded network of water. In the Grotthuss proton-hopping mechanism, protons move in water not through Brownian motion, but rather charge transport through shifting hydrogen bonds. Solutes are known to disrupt the Grotthuss mechanism by interacting with water themselves, rather than allowing protons to associate freely. This slows the proton transport to the wormhole wall during a matrix acidizing treatment. The introduction of salt solutes also has a similar second effect by simply replacing water. The lack of water molecules crowds the fluid and limits the diffusion of protons. The amount of salt present in the composition can be any concentration necessary to provide sufficient acid retardation function.

A second mechanism involves the dissociation of acids in solution. As mentioned, organic acids have higher $pK_a$'s than HCl, making the protons from these acids less available for reaction. In some aspects of the disclosure, compounds that lower the polarizability (as indicated by the dielectric constant) of water are used, which therefore decrease the proton dissociation of acids. It is believed that aqueous solutes can modify the activity of acids in water in one or both of these mechanisms.

A parameter that quantifies the retardation of the acid is the retardation factor. As described herein, the retardation factor indicates the ratio of apparent surface reaction rates. According to the present embodiments, the retardation factor of the aqueous composition is higher or equal to a retardation factor of a second solution of acid of a same concentration as the acid comprised in the aqueous composition without the retarding agent. For example, in various embodiments, the aqueous composition may exhibit an acid retardation factor higher than or equal to about 3, at least about 5, or at least about 11 at about 70° F. At about 200° F., the composition may exhibit an acid retardation factor higher than or equal to about 3, higher than or equal to about 5, or even higher than or equal to about 7.

Another component of the aqueous composition of the present disclosure is water present in an amount sufficient to dissolve the acid and the retarding agent. According to embodiments according to the disclosure, the water concentration included in the aqueous composition may be greater than 0 wt % and lower or equal to 80 wt %. In various embodiments, the water concentration may be lower than 60 wt %, or lower than 40 wt % or lower than 20 wt %, and equal to or higher than 8 wt %, or equal to or higher than 10 wt %. In yet other embodiments, the water concentration may even be lower than 8 wt %.

According to some embodiments, an amount of water is mixed with a retarding agent, where the amount of water is present in an amount between 0.3 and 5 times the mass of the RA, where any lower limit can be 0.35, 0.4, or 0.45 and any upper limit can be 1.0, 1.2, 1.25, where any lower limit can be combined with any upper limit. The procedure further includes dissolving an amount of acid into the combined amount of water and RA. The acid, such as HCl, may be added by any method, such as bubbling HCl gas through the solution. The dissolving of the HCl may occur after dissolving of the RA, simultaneous with the dissolving of the RA, or at least partially before the dissolving of the RA. The amount of HCl gas is in a molar ratio of between 4.0 and 0.5 times the amount of the RA. In yet another embodiment, the procedure includes dissolution of at least a portion of the RA in the water during the dissolution of the HCl in the combined water and RA. Example operations include beginning the dissolution of the HCl and adding the RA as a solid or a solution, providing some of the RA in solution with the water and some of the RA as a solid, and/or providing the RA as a solid in the water and dissolving the HCl into the water while dissolving the RA.

Further, it is also within the scope of the present disclosure that the aqueous compositions may be combined with one or more other additives known to those of skill in the art, such as, but not limited to, corrosion inhibitors, scale inhibitors, demulsifiers, foaming agents, hydrogen sulfide scavengers, reducing agents and/or chelants, and the like. For example, non-surface active substituted ammonium containing amino acid derivatives may be used as environmentally friendly corrosion inhibitors that effectively protect various tools employed in oilfield operations by surface treating these tools.

The corrosion inhibitor is typically provided in liquid form and is mixed with the other components of the treatment fluid at the surface and then introduced into the formation. The corrosion inhibitor system is present in the treatment fluid in an amount of from about 0.2% to about 3% by total weight of the treatment fluid. The corrosion inhibitor used with the fluids of the present disclosure includes an alkyl, alkenyl, alycyclic or aromatic substituted aliphatic ketone, which includes alkenyl phenones, or an aliphatic or aromatic aldehyde, which includes alpha, or beta-unsaturated aldehydes, or a combination of these. Alkyl, alycyclic or aromatic phenone and aromatic aldehyde compounds may also be used in certain applications. Other unsaturated ketones or unsaturated aldehydes may also be used. Alkynol phenone, aromatic and acetylenic alcohols and quaternary ammonia compounds, and mixtures of these may be used, as well. These may be dispersed in a suitable solvent, such as an alcohol, and may further include a dispersing agent and other additives.

Chelating agents are materials that are employed, among other uses, to control undesirable reactions of metal ions. In oilfield chemical treatments, chelating agents are frequently added to matrix stimulation acids to prevent precipitation of solids (metal control) as the acids spend on the formation being treated. These precipitates include iron hydroxide and iron sulfide. In addition, chelating agents are used as components in many scale removal/prevention formulations. Two different types of chelating agents may be used: polycarboxylic acids (including aminocarboxylic acids and polyaminopolycarboxylic acids) and phosphonates. The non-surface active substituted ammonium containing aminoacid derivatives may act as chelating agents when present in the treatment fluid in amount of from about 0.05% to about 10% or from about 1 wt % to about 5 wt %, based upon total weight percent of the treatment fluid.

Some embodiments according to present disclosure are methods for treating a formation penetrated by a wellbore. The methods involve providing an oilfield treatment fluid including an aqueous composition to a high pressure pump and operating the high pressure pump to treat at least one of a wellbore and the formation fluidly coupled to the wellbore. Such an aqueous composition includes an acid and a retarding agent, such as those disclosed hereinabove, and water. In an embodiment, the aqueous composition is prepared by mixing an acid, a salt compound that operates as a retarding agent and water present in an amount sufficient to dissolve the acid and the retarding agent. The operation of the pump may include at least one of (i) injecting the treatment fluid into the formation at matrix rates; (ii) injecting the treatment fluid into the formation at a pressure equal to a pressure that fractures the formation; and (iii) contacting at least one of the wellbore and the formation with the oilfield treatment fluid.

Referring now to FIG. 1, a system 100 used to treat a wellbore 106 and/or a formation 108 fluidly coupled to the wellbore 106 is depicted. The formation 108 may be any type of formation with a bottom hole temperature up to about 204° C. (400° F.). In various embodiments the temperature is at least 38° C. (100° F.). The temperature may also range from about 38° C. to about 204° C. The wellbore 106 is depicted as a vertical, cased and cemented wellbore 106, having perforations providing fluid communication between the formation 108 and the interior of the wellbore 106. However, the particular features of the wellbore 106 are not limiting, and the example provides an example context 100 for a procedure.

The system 100 includes a high-pressure pump 104 having a source of an aqueous composition 102. In a first example, the aqueous composition 102 includes a RA and acid, the acid in an amount of up to about 36 wt % inclusive, and the RA present in a molar ratio between 0.2 and 4.0 inclusive. The aqueous composition 102 further includes water in an amount sufficient to dissolve the acid and the RA. The high pressure pump 104 is fluidly coupled to the wellbore 106, through high pressure lines 120 in the example. The example system 100 includes tubing 126 in the wellbore 106. The tubing 126 is optional and non-limiting. In various embodiments, the tubing 106 may be omitted, a coiled tubing unit (not shown) may be present, and/or the high pressure pump 104 may be fluidly coupled to the casing or annulus 128. The tubing or casing may be made of steel.

Certain additives (not shown) may be added to the aqueous composition 102 to provide an oilfield treatment fluid. Additives may be added at a blender (not shown), at a mixing tub of the high pressure pump 104, and/or by any other method. In one or more embodiments, a second fluid 110 may be a diluting fluid, and the aqueous composition 102 combined with some amount of the second fluid 110 may make up the oilfield treatment fluid. The diluting fluid may contain no acid, and/or acid at a lower concentration than the aqueous composition 102. The second fluid 110 may additionally include any other materials to be added to the oilfield treatment fluid, including additional amounts of an RA. In certain embodiments, an additional RA solution 112 is present and may be added to the aqueous composition 102 during a portion when the aqueous composition 102 is being utilized. The additional RA solution 112 may include the same or a different RA from the aqueous composition 102, and/or may include RA at a distinct concentration from the aqueous composition.

The high pressure pump 104 can treat the wellbore 106 and/or the formation 108, for example by positioning fluid therein, by injecting the fluid into the wellbore 106, and/or by injecting the fluid into the formation 108. Example and non-limiting operations include any oilfield treatment without limitation. Potential fluid flows include flowing from the high-pressure pump 104 into the tubing 126, into the formation 108, and/or into the annulus 128. The fluid may be recirculated out of the well before entering the formation 108, for example utilizing a back side pump 114. Referring still to FIG. 1, the annulus 128 is shown in fluid communication with the tubing 126. In various embodiments, the annulus 128 and the tubing 126 may be isolated (e.g. with a packer). Another example fluid flow includes flowing the oilfield treatment fluid into the formation at a matrix rate (e.g. a rate at which the formation is able to accept fluid flow through normal porous flow), and/or at a rate that produces a pressure exceeding a hydraulic fracturing pressure. The fluid flow into the formation may be either flowed back out of the formation, and/or flushed away from the near wellbore area with a follow up fluid. Fluid flowed to the formation may be flowed to a pit or containment (not shown), back into a fluid tank, prepared for treatment, and/or managed in any other manner known in the art. Acid remaining in the returning fluid may be recovered or neutralized.

Another example fluid flow includes the aqueous composition 102 including an acid and RA. The example fluid flow includes a second aqueous solution 116 including RA. The fluid flow includes, sequentially, a first high pressure pump 104 and a second high pressure pump 118 treating the formation 108. As seen in FIG. 1, the second high-pressure pump 118 is fluidly coupled to the tubing 126 through a second high pressure line 122. The fluid delivery arrangement is optional and non-limiting. In one embodiment, a single pump may deliver both the aqueous solution 102 and the second aqueous solution 116. In yet another example, either the first aqueous solution 102 or the second aqueous solution 116 may be delivered first, and one or more of the solutions 102, 116 may be delivered in multiple stages, including potentially some stages where the solutions 102, 116 are mixed.

The following examples are presented to further illustrate the preparation and properties of the wellbore fluids of the present disclosure and should not be construed to limit the scope of the disclosure, unless otherwise expressly indicated in the appended claims.

EXAMPLES

Various formulations were prepared using different retarding agents and HCl as the acid. A series of tests were conducted to evaluate these formulations. To fully assess the properties of the prepared formulations, the tests were conducted in an autoclave under up to 3000 psi hydrostatic pressure, with the thermal energy transmitted through a silicone oil bath. To determine the retardation factor (RF) of certain additives, formation response tests were conducted with different acid formulations. In the experiments, Indiana limestone cores, which were 1 inch in diameter by 6 inches in length, were held at ~2800 psi confining pressure to ensure that no fluids channeled around the sides, and were heated to desired temperature. The acid fluids were flowed through the core, with a ~1200 psi back pressure, which were conditions provided so the acid will preferentially form wormholes. When the wormhole extended the entire length of the core, the pressure drops across the core approached zero, which was indicative that the fluid was no longer flowing through porous medium, but rather what approximated a tortuous pipe.

Figure 2:
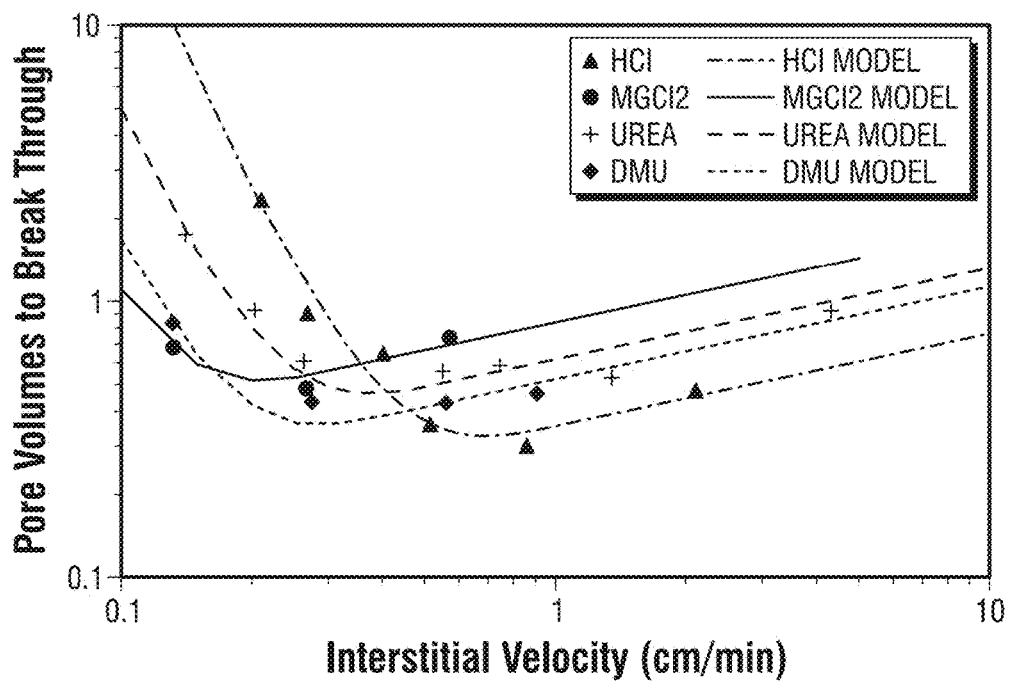
FIG. 2 shows pore volumes to break through versus interstitial velocity curves for aqueous acid solutions based upon tests performed at 70° F., according to the disclosure.
Figure 3:
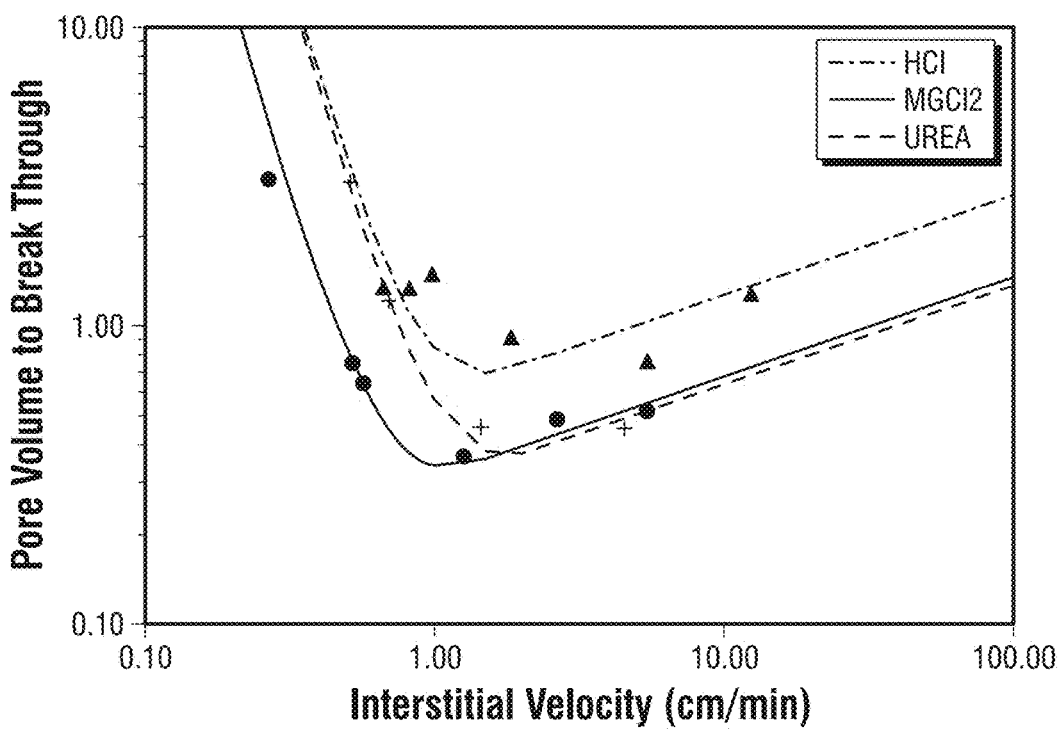
FIG. 3 shows pore volumes to break through versus interstitial velocity curves for aqueous acid solutions based upon tests performed at 200° F., according to the disclosure.

The number of pore volumes of fluid required to create the wormholes was a function of the acid injection velocity ($u_i$, FIGS. 2 and 3). The optimal injection velocity ($u_{i-opt}$) is that which requires the lowest number of pore volumes for the wormhole to break through the core. Using this approach, pore volume to break through ($PV_{BT}$) curves versus interstitial velocity curves were generated and the $u_{i-opt}$ and RF calculated for each acid formulation (Table 1) at 70° F. (FIGS. 2) and 200° F. (FIG. 3).

TABLE 1

Retardation Factors of Acid Formulations

| Entry | Temperature (° F.) | Retarding Agent Additive | Retarding Agent concentration (% by weight) | Estimated retardation factor (RF) |
|---|---|---|---|---|
| 1 | 70 | none | — | — |
| 2 | | urea | 18.5 | 3.3 |
| 3 | | N,N'-dimethyl urea (DMU) | 27 | 5.8 |
| 4 | | MgCl$_2$ | 19 | 10.9 |
| 5 | 200 | none | — | — |
| 6 | | urea | 18.5 | 1.3 |
| 7 | | MgCl$_2$ | 19 | 3.1 |

The estimated retardation factor was calculated according to the following equation:

$$RF_x \sim \left(\frac{u_{i-opt,HCl}}{u_{i-opt,x}}\right)^2$$

All aqueous fluids evaluated contained hydrochloric acid (15% weight/volume) and a corrosion inhibitor (0.6% by volume). The results demonstrate that compounds which disrupt the hydrogen bonding network of water and its dielectric constant are able to retard the activity of acid in subterranean formations. In particular, magnesium chloride (MgCl$_2$) used as a retarding agent showed significant retardation at similar or lower concentrations than the other retarding evaluated.

Wormholes in carbonate formations can acquire different structures depending on the rate of acid injection. At very low injection rates, there is no wormhole at all, as only the face of the formation dissolves. Wormholes that do form at low injection rates tend to be broad and conical. Close to the optimum injection rate, a dominant, narrow wormhole forms with a small amount of branching. When the injection rate is increased past the optimum injection rate, the acid is forced into less permeable zones and creates a ramified (highly branched) wormhole. Ramified structures will transition to uniformly dissolved rock at very high injection rates. By comparing the characteristics of the injection face of the cores from the acid injection experiment described in evaluations above, estimates of the wormhole characteristics can be made. Table 2 provides the low acid injection rates, break through times and pore volumes, from the evaluations above at 200° F., and FIGS. 4A-4C graphically illustrate the core face images and break through characteristics at low acid injection rates at 200° F. (photographic representations are provided in U.S. Provisional Application Ser. No. 62/154,945, and included herein by incorporation).

TABLE 2

Core face images and break through characteristics at low acid injection rates at 200° F.

| | Fluid=> | | |
|---|---|---|---|
| | 15% HCl | 15% HCl + 18.5% urea | 15% HCl + 19% $MgCl_2$ |
| Injection rate (ml/min) | 0.2 | 0.3 | 0.2 |
| Break through time (h:mm) | >3:30 | >1:30 | 0:34 |
| Pore volumes to break through | >3.4 | >3 | 0.53 |

In the tests performed at 200° F., the core faces treated with 15% HCl (FIG. 4A) and 15% HCl with urea (FIG. 4B), both showed a large amount of core facial dissolution 402 and developing conical wormholes 404. In both cases, however, the confining pressure punctured the sleeve holding the core because too much of the rock face dissolved. For the 15% HCl with $MgCl_2$ fluid (FIG. 4C), the entry wormhole was much smaller and the wormholes 406 broke through to the opposite face in a timely fashion, 34 minutes with 0.53 pore volumes to break through. These indicate that at lower injection rates, retarded acid with $MgCl_2$ was effective. Table 3 provides the results of the same experiment conducted at 250° F., with similar comparative results both in data and facial dissolution as shown in FIG. 4D (for HCl alone) and FIG. 4E (for HCl with $MgCl_2$). A large amount of core facial dissolution 402 and a developing conical wormholes 404 occurred with HCl alone, while little facial dissolution and a narrower wormhole 406 resulted with the HCl and $MgCl_2$ mixture.

TABLE 3

Core break through characteristics at low acid injection rates at 250° F.

| | Fluid=> | |
|---|---|---|
| | 15% HCl | 15% HCl + 19% $MgCl_2$ |
| Injection rate (ml/min) | 0.4 | 0.4 |
| Break through time (h:mm) | >2:05 | 0:13 |
| Pore volumes to break through | >4 | 0.34 |

Figure 5:
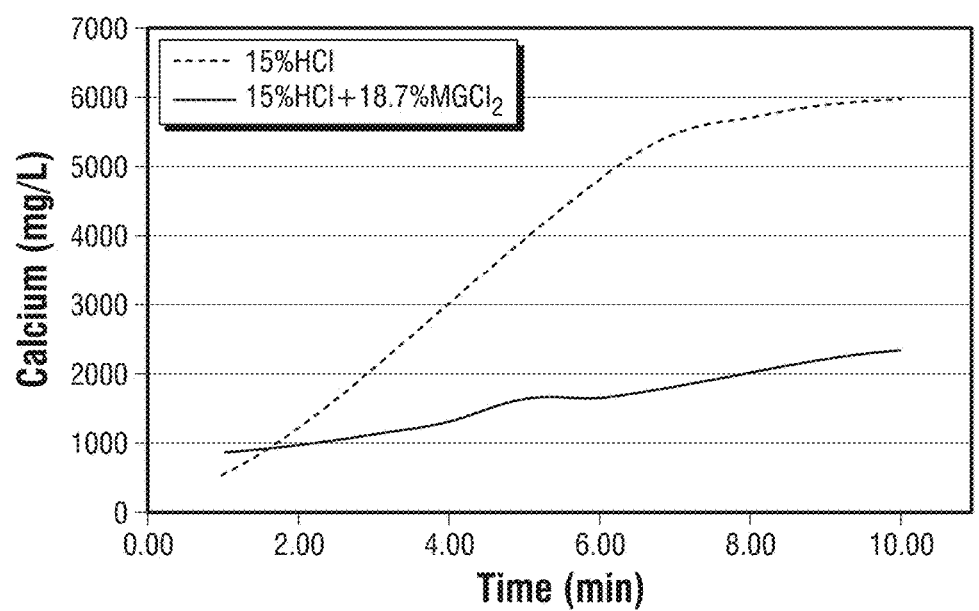

In another example, rotating disk experiments were performed to characterize the relative surface reaction rates of acidic solutions. The experiment was conducted by spinning a marble or limestone disk, at ambient temperature and 1250 rpm, in an acid formulation, and periodically sampling the solution. The samples were then analyzed for the calcium concentration as a function of time, which gives the rate constant of calcite ($CaCO_3$) dissolution by hydrochloric acid containing solutions. A decrease in rate constant indicates an acid retarding agent formulation whose surface reaction is retarded relative to hydrochloric acid alone, without any retarding agent. The plot in FIG. 5 illustrates slower dissolution rate, or slower rate of $Ca^{2+}$ ions liberation over time, for the 15% HCl solution containing $MgCl_2$ compared with unmodified 15% HCl within 10 minutes. The results in FIG. 5 are a comparison of 15% HCl alone to 15% HCl mixed with 18.7% $MgCl_2$ retarding agent.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method, comprising:
combining an amount of water and an acid retarding agent (RA) present at a concentration that inhibits activity of acid through a mechanism other than dilution, wherein the amount of water is present in an amount up to about 5 times the mass of the RA, inclusive, wherein the RA comprises at least one salt compound and wherein at least a portion of the RA is present in solid form;
dissolving an amount of the acid in the combined amount of water and acid retarding agent to form a non-emulsified composition, wherein a molar ratio of the acid:the acid retarding agent in the composition is between 4.0 and 0.2, inclusive, and wherein the acid is present in the non-emulsified composition at a concentration up to about 36% by weight; and
injecting the composition into a wellbore penetrating a subterranean formation at a pressure lower than a fracture initiation pressure of the subterranean formation.

2. The method of claim 1 further comprising forming wormholes in the subterranean formation.

3. The method of claim 1, wherein the acid is one or more of hydrogen chloride, hydrogen bromide, hydrogen iodide, hydrogen fluoride, sulfuric acid, nitric acid, phosphoric acid, alkanesulfonic acids or arylsulfonic acids.

4. The method of claim 1, wherein the acid is one or more of acetic acid, formic acid, alkyl carboxylic acids, acrylic acid, lactic acid, glycolic acid, malonic acid, fumaric acid, citric acid and tartaric acid.

5. The method of claim 1, wherein the acid is hydrogen chloride.

6. The method of claim 1, wherein the at least one salt compound comprises one or more cations selected from lithium, sodium, potassium, rubidium, cesium, beryllium, magnesium, calcium, strontium, barium, scandium, yttrium, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, boron, aluminum, gallium, indium, thallium, tin, ammonium, alkylammonium, dialkylammonium, trialkylammonium and tetraalkylammonium, and one or more anions selected from fluoride, chloride, bromide, iodide, sulfate, bisulfate, sulfite, bisulfite nitrate, alkanesulfonates, arylsulfonates, acetate and formate.

7. The method of claim 1, wherein the at least one salt compound is magnesium chloride.

8. The method of claim 1, wherein the acid retarding agent has an estimated retardation factor of at least about 3 at a temperature of 200° F.

9. The method of claim 1, wherein the acid retarding agent has an estimated retardation factor of at least about 11 at a temperature of 70° F.

10. The method of claim 1, further comprising dissolving at least a portion of the acid retarding agent in the amount of water during the dissolving the amount of acid into the combined amount of water and acid retarding agent.

11. The method of claim 1, wherein the acid is present in an amount of from about 7.5 to about 36 wt % based on the total weight of the composition.

12. The method of claim 1, wherein the acid is present in an amount of from about 7.5 to about 28 wt % based on the total weight of the composition.

13. The method of claim 1, wherein the acid is present in an amount of from about 7.5 to about 20 wt % based on the total weight of the composition.

14. The method of claim 1, wherein the concentration of the acid retarding agent is up to about 40 wt % based on the total weight of the composition.

15. The method of claim 1, wherein the concentration of the acid retarding agent is from about 10 to about 36 wt % based on the total weight of the composition.

16. The method of claim 1, wherein the concentration of the acid retarding agent is from about 10 to about 30 wt % based on the total weight of the composition.

17. A method, comprising:
combining an amount of water and an acid retarding agent (RA) present at a concentration that inhibits activity of acid through a mechanism other than dilution, wherein the acid retarding agent comprises at least one salt compound, wherein at least a portion of the RA is present in solid form;
dissolving an amount of the acid in the combined amount of water and acid retarding agent to form a non-emulsified composition, wherein the amount of acid comprises up to about 36% by weight of total weight of the composition; and
using a high pressure pump to inject the non-emulsified composition into a wellbore penetrating a subterranean formation having a fracture initiation pressure;
wherein the acid retarding agent has an estimated retardation factor of at least about 5 at a temperature of 70° F.

18. The method of claim 17, wherein the composition is injected into the wellbore at a pressure lower than the fracture initiation pressure of the subterranean formation.

19. The method of claim 17, wherein the composition is injected into the wellbore at a pressure equal to or greater than the fracture initiation pressure of the subterranean formation.

20. A method, comprising:
combining an amount of water and an acid retarding agent (RA) present at a concentration that inhibits activity of acid through a mechanism other than dilution, wherein the acid retarding agent comprises at least one salt compound and urea, and wherein at least a portion of the RA is present in solid form;
dissolving an amount of the acid in the combined amount of water and acid retarding agent to form a non-emulsified composition, wherein the acid is present at a concentration between about 37% and 45.7% by weight of the composition; and
injecting the composition into a wellbore penetrating a subterranean formation.

* * * * *